United States Patent Office 2,761,855
Patented Sept. 4, 1956

2,761,855

POLYMERIC VINYL CHLORIDE FIBER-FORMING COMPOSITIONS

George E. Ham, Dayton, Ohio, assignor to The Chemstrand Corporation, Decatur, Ala., a corporation of Delaware No Drawing. Application May 5, 1952,
Serial No. 286,209

7 Claims. (Cl. 260—45.5)

This invention relates to new fiber-forming compositions. More particularly the invention is concerned with the production of new polyvinyl chloride composition and articles produced therefrom which have superior properties such as improved stability to heat, etc., as hereinafter described.

It is well-known to prepare polymeric materials from vinyl chloride and these materials are finding greatly expanding usefulness. Fibers and other shaped articles of polyvinyl chloride have been marketable because of the relatively low cost of vinyl chloride. However, polyvinyl chloride possesses several drawbacks which have discouraged the use of shaped articles of polyvinyl chloride in many fields of application. For example, polyvinyl chloride softens and shrinks excessively at elevated temperatures and when articles produced from polyvinyl chloride are used for some time in the presence of heat they begin to stiffen and become brittle. Hence the problem is presented to provide a means for preparing high quality products of polyvinyl chloride having improved heat stability, particularly with respect to shrinkage.

Accordingly, it is an object of the present invention to provide new vinyl chloride compositions which are not objectionable with respect to thermal stability. A further object of the invention is to provide an improved low cost fiber-forming composition. Other objects and advantages of the present invention will be apparent from the description thereof hereinafter.

While the present invention is described as it is primarily applicable to the manufacture of fibers and filaments, it is to be understood that this is merely intended in an illustrative sense and the invention is not to be limited thereby, since the same is also applicable to the manufacture of other shaped articles of polyvinyl chloride, such as films, foils, rods, threads, molded articles, and the like, etc.

It has been found and the objects of the invention are in general accomplished by blending polyvinyl chloride with from 2–35% of a polymer of a polymerizable polynuclear monomer. Such blended compositions have been found to be substantially improved with respect to their softening characteristics and are thus more dimensionally stable to high temperatures than polyvinyl chloride per se. In the compositions of the present invention, the polyvinyl chloride is present in an amount within the range of 65 to 98% by weight. While the present invention is primarily concerned with improving the thermal stability of polyvinyl chloride, it is also applicable to improving the thermal stability of various copolymers of vinyl chloride, such as those containing up to 15% by weight of vinyl acetate, vinylidene chloride, acrylonitrile, methacrylonitrile and methyl acrylate.

Suitable polymers of polynuclear monomers for use in the practice of this invention are poly-N-vinylcarbazole, polyvinylanthracene, polyvinylnaphthalene, polyvinylpyrene, polyvinylfluorene, polyvinylphenoxthin, polyacenaphthylene, poly-p-vinylbiphenyl, polyisopropenylbiphenyl, polyvinylacenaphthene and other polymerizable monomers containing a plurality of homocyclic and/or heterocyclic ring structures.

The vinyl substituted polynuclear compounds and the polyvinyl chloride may be blended by a variety of procedures. The finely divided polymers may be mechanically mixed and thereafter fabricated into fibers by conventional methods, for example, the dissolution in suitable solvents and extrusion of the prepared solution through a die or spinneret containing a plurality of apertures. Following the preparation of the fiber by extrusion into a gaseous medium or a liquid medium adapted to remove the solvent from the continuous polymeric composition, the resulting fiber is then stretched, shrunk or otherwise subjected to physical working or heat-treatment to develop the optimum fiber properties. The methods of fabricating and processing the fibers are not regarded as part of this invention, except to the extent that a wider variation in types of processing is possible.

A preferred method of preparing a blended composition involves the dispersing of the polymeric components into a suitable solvent for both components. Suitable solvents are N,N-dimethylacetamide, N,N-dimethylformamide, gamma-butyrolactone, nitromethane, dimethyl phosphite, and ethylene carbonate. Solutions in these solvents are spun into fibers by conventional methods.

Further details of the invention are set forth with respect to the following examples:

*Example I*

An 18% solids solution in dimethylacetamide was prepared of a blend of 80% by weight of polyvinyl chloride and 20% poly-N-vinylcarbazole. The resultant solution was slightly cloudy. The polymeric solution was spun through a spinneret, having 30 apertures each 0.005" in diameter, into a mixture of 60% dimethylacetamide and 40% water, and the fibers thus formed were washed continuously with hot water. The fibers were processed in the form of a bundle or tow and the tow was dried on a steam heated drum and stretched 152% in a steam tube. The white fiber thus obtained possessed a tenacity of 1.23 gm./denier and an elongation of 6–12%.

The shrinkage of the fiber was then determined at various temperatures employing a Fisher-Johns melting point block modified with a grid scale. The following shrinkage data were obtained:

| Temperature: | Percent shrinkage |
|---|---|
| 60° C. | 2.5 |
| 95° C. | 30 |
| 155° C. | 67 |
| 220° C. | 72.5 |

A zero strength temperature of 150° C. was obtained. The zero strength temperature was determined by contacting the fiber under slight tension with a heated rod of known temperatures.

A second solution containing 18% of polyvinyl chloride in dimethylacetamide was prepared and the resultant solution spun into fibers as outlined above. The fibers were then stretched 138% as described above and the following shrinkage data on the fibers thus obtained:

| Temperature: | Percent shrinkage |
|---|---|
| 55° C. | 2.5 |
| 105° C. | 50 |
| 220° C. | 78 |

The zero strength temperatures for the polyvinyl chloride fiber without the poly-N-vinylcarbazole was 133° C.

It can readily be seen from the above data that the addition of a polynuclear compound to the polyvinyl chloride greatly enhances its stability to heat, there being an increase in the zero strength temperature of 17° C.

Example II

A 19% solids solution in dimethylacetamide was prepared of a blend of 80% by weight of polyvinyl chloride and 20% polyacenaphthylene. The resultant solution was spun and fibers stretched as described in Example I. Shrinkage and zero strength temperature data of the resultant fiber were comparable to those obtained from the polyvinylcarbazole blend.

Example III

An 18% solids solution in dimethylacetamide was prepared of a blend of 80% by weight of polyvinyl chloride and 20% poly-p-vinylbiphenyl. The resultant solution was spun and fibers stretched as in Example I. A significant improvement in shrinkage and zero strength temperature data over those of polyvinyl chloride was found.

Fibers, films, and other shaped articles, produced from the compositions in accordance with the present invention, find wide use in a manufacture of such materials as seat covers, table covers, shower curtains, and the like, and many other articles where stability to heat is important. Many other advantages of the instant invention will be apparent to those skilled in the art.

It is to be understood that changes and variations may be made without departing from the spirit and scope of the invention as defined in the appended claims.

I claim:

1. A fiber-forming composition which comprises a blend of from 65 to 98% by weight of polyvinyl chloride and from two to 35% by weight of a polymer of the group consisting of poly-N-vinylcarbazole, polyvinylanthracene, polyvinylnaphthalene, polyvinylpyrene, polyvinylfluorene, polyvinylphenoxthin, polyacenaphthylene, polyvinylbiphenyl, polyisopropenylbiphenyl, and polyvinylacenaphthene, said composition having a zero strength temperature above 133° C. when in the form of a fiber.

2. The fiber-forming composition defined in claim 1 wherein the polymer is poly-N-vinylcarbazole.

3. The fiber-forming composition defined in claim 1 wherein the polymer is polyvinylbiphenyl.

4. The fiber-forming composition defined in claim 1 wherein the polymer is polyisopropenylbiphenyl.

5. The fiber-forming composition defined in claim 1 wherein the polymer is polyacenaphthylene.

6. The fiber-forming composition defined in claim 1 wherein the polymer is polyvinylnaphthalene.

7. A fiber-forming composition which comprises a blend of from 65 to 98% by weight of a polymer containing by weight in the polymer molecule at least 85% of vinyl chloride and not more than 15% of another polymerizable mono-olefinic monomer and from two to 35% by weight of a polymer selected from the group consisting of poly-N-vinylcarbazole, polyvinylanthracene, polyvinylnaphthalene, polyvinylpyrene, polyvinylfluorene, polyvinylphenoxthin, polyacenaphthylene, polyvinylbiphenyl, polyisopropenylbiphenyl, and polyvinylacenaphthene, said composition having a zero strength temperature above 133° C. when in the form of a fiber.

References Cited in the file of this patent

UNITED STATES PATENTS

| | | |
|---|---|---|
| 2,072,465 | Reppe et al. | Mar. 2, 1937 |
| 2,155,591 | Garvey | Apr. 25, 1939 |
| 2,317,076 | Mick et al. | Apr. 20, 1943 |
| 2,371,499 | Britton et al | Mar. 13, 1945 |
| 2,449,684 | Bacon et al. | Sept. 21, 1948 |
| 2,496,868 | Flowers | Feb. 7, 1950 |
| 2,566,716 | Boe et al. | Sept. 4, 1951 |